United States Patent
Matsuo (10) Patent No.: US 12,081,715 B2
(45) Date of Patent: Sep. 3, 2024

(54) INDUSTRIAL PRINTING SYSTEM, PRINT SERVER, AND INDUSTRIAL PRINTING METHOD FOR GENERATING AND REPRINTING PRINT JOB TO ARCHIVE

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/950,138

(22) Filed: Sep. 22, 2022

(65) Prior Publication Data
US 2024/0106959 A1    Mar. 28, 2024

(51) Int. Cl.
*H04N 1/32* (2006.01)
*G06F 3/12* (2006.01)
*G06K 15/02* (2006.01)

(52) U.S. Cl.
CPC ....... *H04N 1/32545* (2013.01); *G06F 3/1204* (2013.01); *G06F 3/1264* (2013.01); *G06K 15/1886* (2013.01)

(58) Field of Classification Search
None
See application file for complete search history.

(56) References Cited

U.S. PATENT DOCUMENTS

| | | | |
|---|---|---|---|
| 2005/0157330 A1* | 7/2005 | Giuliano | G06F 3/1282 358/1.15 |
| 2010/0171982 A1* | 7/2010 | Sato | G06F 3/1204 358/1.15 |
| 2015/0156351 A1 | 6/2015 | Yamamoto | |

FOREIGN PATENT DOCUMENTS

JP         2015-107555 A       6/2015

* cited by examiner

*Primary Examiner* — Frantz Bataille
(74) *Attorney, Agent, or Firm* — Hawaii Patent Services; Nathaniel K. Fedde; Kenton N. Fedde (57) ABSTRACT

Provided is an industrial printing system that reprints from an archive of production prints. Industrial printing systems include a plurality of print servers that perform production printing. Any of the print servers includes an archive job generation unit and a reprint unit. The archive job generation unit generates a print job to archive including a content job that is a job for each print component. The reprint unit transmits the content job included in the print job generated by the archive job generation unit to the other print server for reprinting. The content job includes a storage location, which may be in the other print server where the rasterized file in which the printed component was rasterized is stored, and a job ticket for the content job.

18 Claims, 7 Drawing Sheets

Order job
- Order job ID : JOB ID
- Expiration : EXPIRATION OF JOB

Content job 210-1
- Content job ID : JOB ID
- Server : SERVER INFORMATION OF PRINT SERVER 1 WHERE RASTERIZED FILE 220 IS STORED
- File : FILE LOCATION OF RASTERIZED FILE 220
- URL : STORAGE LOCATION OF RASTERIZED FILE 220 (SERVER OR FILE)
- Job Ticket : PAPER, COLOR PROFILE INFORMATION, OR THE LIKE
- Page : PAGE
- Destination printer : DESTINATION PRINTER
- Expiration : EXPIRATION OF JOB
- Print permission : ORDER JOB ID THAT CAN BE PRINTED IN COMBINATION Content job 210-2
- Content job ID :
- Server :
- File :
- ...

Content job 210-3

Book-A001
- Order job ID : 12345
- Expiration : 2022/12/31

— BODY (CONTENT JOB 210-1)
- Content job ID : 12345.1
- Server : 123.456.789.111
- File : /local/archive/A001/book-body.tif
- URL :
- Job Ticket : /local/archive/A001/book-body.jdf
- Page : 2-999
- Destination printer : Printer-A
- Expiration : n/a
- Print permission : n/a — COVER (CONTENT JOB 210-2)
- Content job ID : 12345.2
- Server : 123.456.789.222
- File : /local/archive/A001/book-cover.tif
  ⋮

— BELT (CONTENT JOB 210-3)
⋮

INDUSTRIAL PRINTING SYSTEM, PRINT SERVER, AND INDUSTRIAL PRINTING METHOD FOR GENERATING AND REPRINTING PRINT JOB TO ARCHIVE

BACKGROUND

The present disclosure relates to an industrial printing system, a print server, and an industrial printing method with distributed processing, particularly for industrial printing (production printing).

Among print systems that typically include a plurality of printers, there is a print system that perform so-called ubiquitous printing. In this system, when the print system including a plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the predetermined order from the first MFP to the Nth MFP. This saves the ubiquitous job in the memory of the MFP that can process it. As a result, in the printing system, it is possible to reduce the waiting time until the user obtains the printed matter.

That is, in this typical technique, a job is transferred to each MFP and it is determined whether or not the transferred MFP itself can process the job.

On the other hand, in industrial printing called production printing, which uses a commercial (industrial) printing apparatus, the composed members of the final product are produced by dividing the work into a plurality of processes. For example, in the case of bookbinding, covers, body (color), body (black and white), promotional items, bands, shipping envelopes, or the like, are processed as different jobs. Then, in the middle of the process, each job is combined and finished as a book as the final product.

SUMMARY

An industrial printing system of the present disclosure is an industrial printing system having a plurality of print servers for production printing, any of the plurality of print servers including: an archive job generation unit configured to generate a print job to archive including a content job that is a job for each print component; and a reprint unit configured to transmit the content job included in the print job generated by the archive job generation unit to other print server to execute reprinting; and wherein the content job includes a storage location allowing in the other print server in which a rasterized file that is a file in which the print component is rasterized is stored, and a job ticket for the content job.

A print server according to the present disclosure is a print server for production printing including: an archive job generation unit configured to generate a print job to archive including a content job that is a job for each print component; and a reprint unit configured to transmit the content job included in the print job generated by the archive job generation unit to other print server to execute reprinting; and wherein the content job includes a storage location allowing in the other print server in which a rasterized file that is a file in which the print component is rasterized is stored, and a job ticket for the content job.

An industrial printing method of the present disclosure is an industrial printing method performed by an industrial printing system having a plurality of print servers for production printing, comprising the steps of: generating a print job to archive including a content job for each print component, wherein the content job includes a storage location allowing in other print server in which a rasterized file that is a file in which the print component is rasterized is stored, and a job ticket for the content job; and sending the content job included in the print job to the other print server to execute reprinting.

DETAILED DESCRIPTION

Embodiment

[Configuration of Industrial Printing System X]

Figure 1:
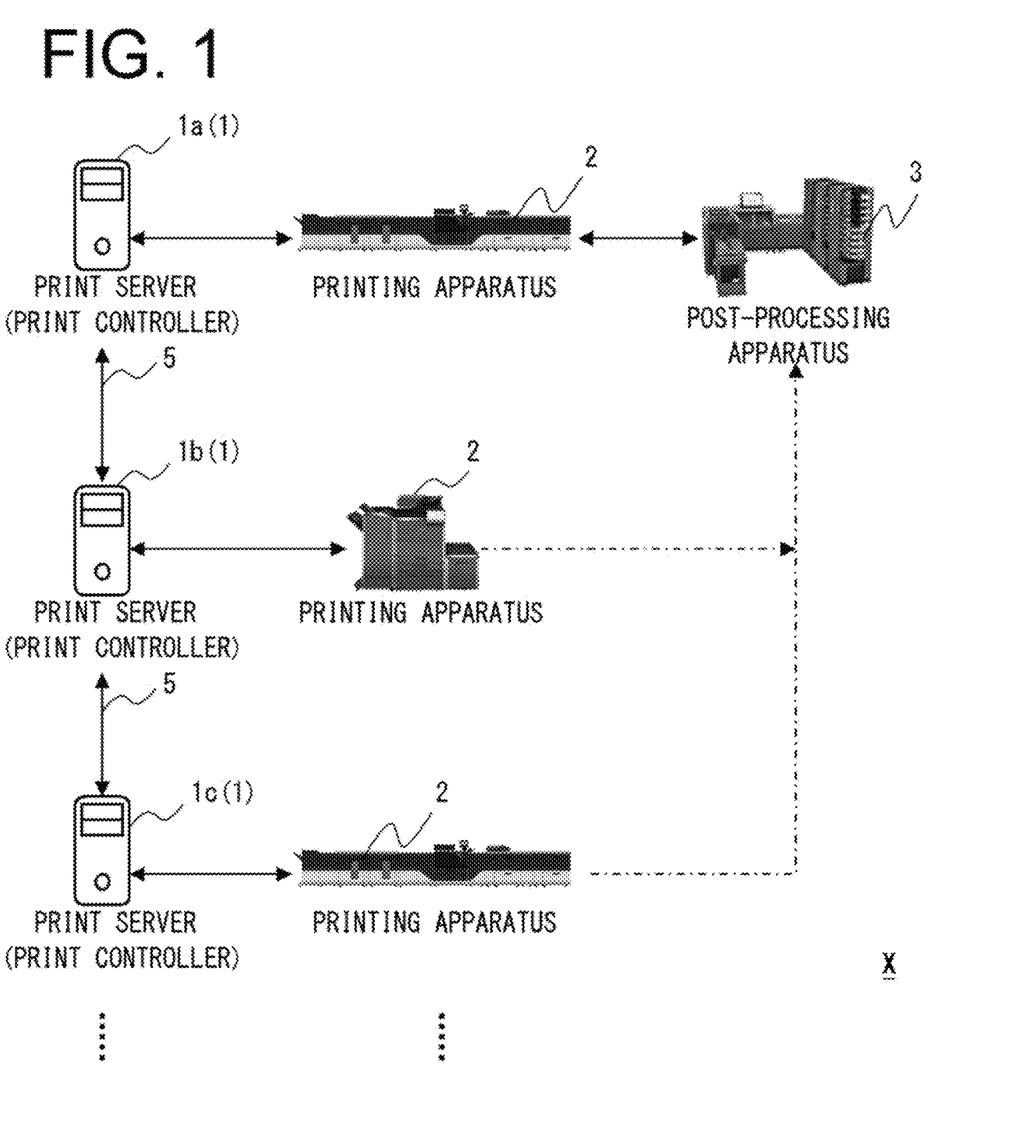
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing process and a post-processing process (hereinafter also simply referred to as "printing") in industrial printing (production printing).

Here, in the industrial printing system X of the present embodiment, a final product such as a book to be output is defined as an "order", and each component of the order is defined as a job.

In the industrial printing system X, printing companies, printing factories, or the like, including a print server 1 and component apparatuses (groups) such as a printing apparatus 2, a post-processing apparatus 3, a shipping server 4, or the like, are distributed and connected with a network 5.

FIG. 1 shows an example that each of print server 1a, 1b, 1c, . . . is connected with the network 5, and these print servers 1a, 1b, and 1c, . . . are connected to the printing apparatus 2 is shown. Hereinafter, in case of referring to any one of these print servers 1a, 1b, 1c, . . . , it is simply called as the print server 1.

The print server 1 is an information processing apparatus serving as a print controller that manages and controls printing-related apparatuses including the printing apparatus 2 and post-processing apparatus 3 (hereinafter referred to as "component apparatuses"). The print server 1 is configured as a PC (Personal Computer) server, a dedicated apparatus, a general-purpose apparatus, or the like.

In the present embodiment, the print server 1 executes a dedicated print management application software (hereinafter simply referred to as an "application") to distribute and print the content job 210 (FIG. 3) for production printing. The print management application (hereinafter referred to as a "dedicated application") may run on a common platform that performs print design creation, user management, tenant management, security management, maintenance notification service, prepress processing management, storage management of each document, and management of the printing apparatus 2, or the like.

Figure 3:
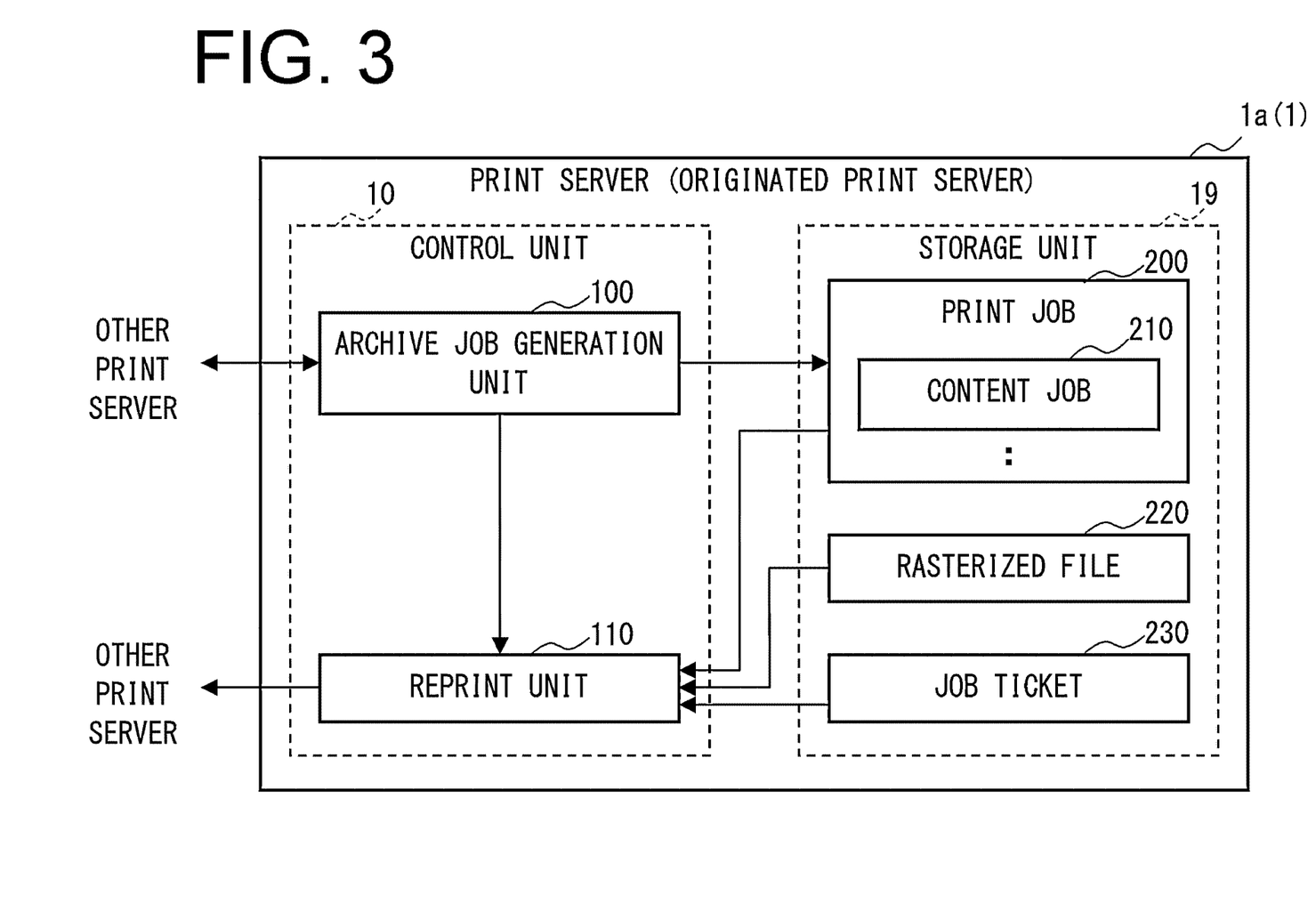
FIG. 3 is a block diagram showing the functional configuration of the print server as shown in FIG. 1.

Specifically, in production printing, the print server 1 transmits and receives various instructions and information to and from the printing apparatus 2, the post-processing apparatus 3, and the like. As a result, the print server 1 manages the status of each apparatus and requests processing of the content job 210 of the print job 200 (FIG. 3).

Each print server 1 assigns processing of the content job 210 to each component apparatus and causes the processing to be executed according to the schedule.

The printing apparatus 2 is an industrial printer including an image forming apparatus that performs small-lot printing, an automated printing apparatus that performs printing processes such as offset printing, or the like, for large-volume (multiple-lot) printing, and the like. The printing apparatus 2 according to the present embodiment may differ in size, quality, color profile, recordable range, or the like of recording paper used in the printing process.

The printed matter printed by each printing apparatus 2 is post-processed in a post-processing step by using the post-processing apparatus 3. In this case, the printed matter printed by the printing apparatus 2 connected to the other print server 1 may be processed by the same post-processing apparatus 3 or by a different apparatus.

The post-processing apparatus 3 is various apparatuses for executing post-processing processes such as folding, collation, bookbinding, and cutting of recording paper printed by the printing apparatus 2.

As for the post-processing apparatus 3 according to the present embodiment, a plurality of apparatuses having different contents and ranges of processes that can be performed in the post-processing step may be used.

The printed matter for which post-processing has been completed is shipped as an order such as a book. At this time, the order may be managed by a shipping server that manages shipping.

network 5 is a LAN (Local Area Network), a wireless LAN (Wi-Fi), a WAN (Wide Area Network), a mobile telephone network, an industrial network, a voice telephone network, other dedicated lines, or the like. The network 5 can transmit and receive various commands and data to and from each apparatus. Furthermore, the connection between the print server 1 and each component apparatus may also be connected via a LAN or the like of the network 5. In addition, the network 5 may be configured with a VPN (Virtual Private Network), or the like.

In addition, a plurality of these apparatuses may exist according to the purpose, the scale of printing, and the like. Each apparatus can be connected to the print server 1 by various protocols via the network 5, LAN, or the like. Alternatively, the print server 1 and each apparatus may be directly connected by wire using various interfaces.

In addition, the other component apparatuses managed by each print server 1 may be provided. The other component apparatuses include, for example, a terminal for manuscript submission, a terminal for design proofreading, a prepress apparatus, and the like.

In addition, each print server 1 may be connected via a network 5 to an administrator terminal or a general terminal used by an administrator or a user. Thus, each print server 1 can be accessed by the administrator or the user by using a web browser, terminal, dedicated application, or the like, on the administrator terminal, a console, or the like. Moreover, each print server 1 can create and acquire print jobs 200, print design, submit a manuscript, manage prepress processing, check the progress, and issue processing requests, or the like.

[Control Configuration of Print Server 1]

Figure 2:
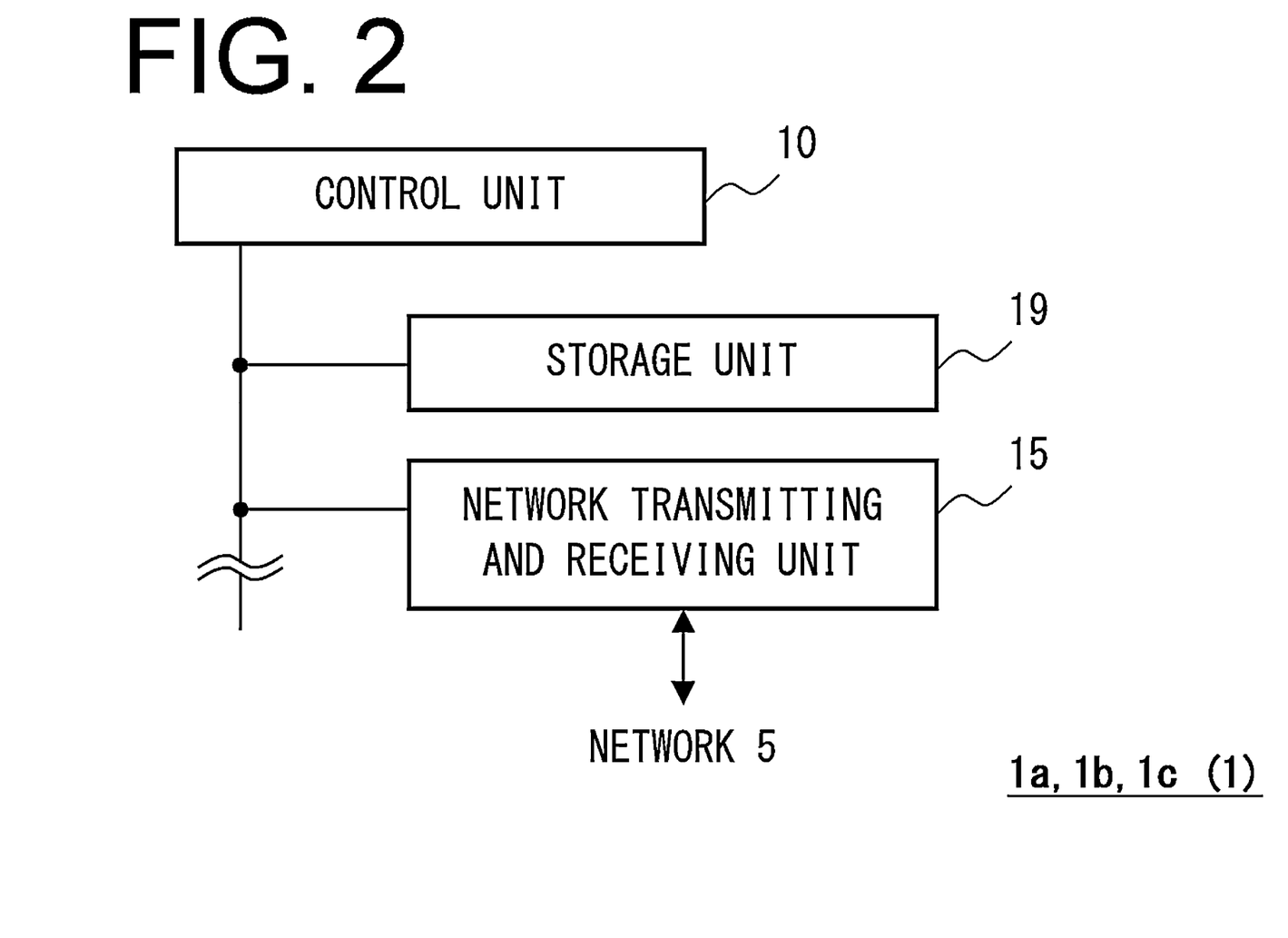
FIG. 2 is a block diagram showing the control configuration of the print server as shown in FIG. 1.

Next, as refer to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated circuit, processor for specific applications), or the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal, the console, or the like.

The network transmitting and receiving unit 15 is a network connection unit including a LAN board, a wireless transmitting and receiving device, or the like, for connecting to the external network 5.

The network transmitting and receiving unit 15 transmits/receives data through a data communication line, and it transmits/receives voice signals through a voice telephone line.

storage unit 19 is a non-transitory recording medium such as semiconductor memory, which is ROM (Read Only Memory), RAM (Random Access Memory), or the like, or HDD (Hard Disk Drive), or the like.

A control program for controlling the operation of the print server 1 is stored in the ROM or HDD of the storage unit 19. The control program includes an OS (Operating System), middleware on the OS, a service (a daemon), various applications, database data, and the like. Among these, the various applications include the printing process management application as described above. Furthermore, the storage unit 19 may also store an account setting for the user and the administrator of the industrial printing system X, other data, and the like.

In addition, in the print server 1, the control unit 10 may be integrally formed, such as a CPU that a GPU is built-in, chip-on-module package, SOC (System On a Chip), or the like.

Also, the control unit 10 may have built-in RAM, ROM, flash memory, or the like.

[Functional Configuration of Print Server 1]

Here, with reference to FIG. 3, the functional configuration of the print server 1 is described.

In the present embodiment, among the print servers 1, the print server 1 that manages the print job 200 and requests printing is hereinafter referred to as the "originated print server", and the print server 1 that is requested printing of the content job 210 is hereinafter referred to as the "other print server". In the present embodiment, an example is described in which the print server 1*a* is the originated print server and the print servers 1*b*, 1*c*, . . . are the other print server(s).

Further, in the present embodiment, the control unit 10 of the print server 1 includes an archive job generation unit 100 and a reprint unit 110.

The storage unit 19 stores a print job 200, a rasterized file 220, and a job ticket 230.

The archive job generation unit 100 generates a print job 200 to archive.

The archive job generation unit 100 acquires the ID and storage location of each content job 210 from the other print server when generating the print job 200. After that, the archive job generation unit 100 sets this ID and storage location in the content job 210.

The reprint unit 110 transmits the content job 210 included in the print job 200 generated by the archive job generation unit 100 to the other print server for reprinting. In the present embodiment, the reprint unit 110 transmits the job ticket 230 of the content job 210, schedules printing, and requests printing to the other print server.

In this case, the reprint unit 110 does not reprint the content job 210 that is expired an expiration date.

In addition, the reprint unit 110 causes reprinting to be executed only in combination with "a specific print job", which is the print job 200 that is permitted.

A print job 200 is data of an order job for printing an order configured to a plurality of components in production printing. Specifically, the print job 200 may be a file (collection of data) in which various types of data used at the time of printing are collected. Specifically, the print job 200 may be described, for example, in JDF (Job Description Format) and/or JMF (Job Messaging Format).

Here, in the present embodiment, print job 200 is stored to archive for reprinting. At this time, the print job 200 includes a rasterization file 220 for each print component to be structured.

The details of the print job 200 is described later.

The rasterized file 220 is a file of electronic document data in which a printed component has performed raster-in-process (hereinafter, called as abbreviation of "RIP" or "rasterize").

In the present embodiment, the rasterized data includes, for example, electronic document data such as PDF (Portable Document Format), or the like, bitmap data (raster image data), or data of the other type printed on the other print server or the originated print server based on the job ticket 230. The image data in the rasterized file 220 may be reversibly compressed or irreversibly compressed.

In the present embodiment, an example that the rasterized file 220 is a PDF including TIFF or the other raster image data is described.

The job ticket 230 is setting data for requesting the print job 200.

In the present embodiment, as the job ticket 230, the job ticket of the content job 210, which is a job of a print component, is stored. The job ticket 230 includes, for example, settings necessary for imposition positions, post-processing, or the like, in a workflow, which is the order setting. In addition, the job ticket 230 includes information such as an ICC profile (color profile) and other printing resources necessary for printing.

In the present embodiment, the job ticket 230 may also be written in JDF and/or JMF.

Figure 4:
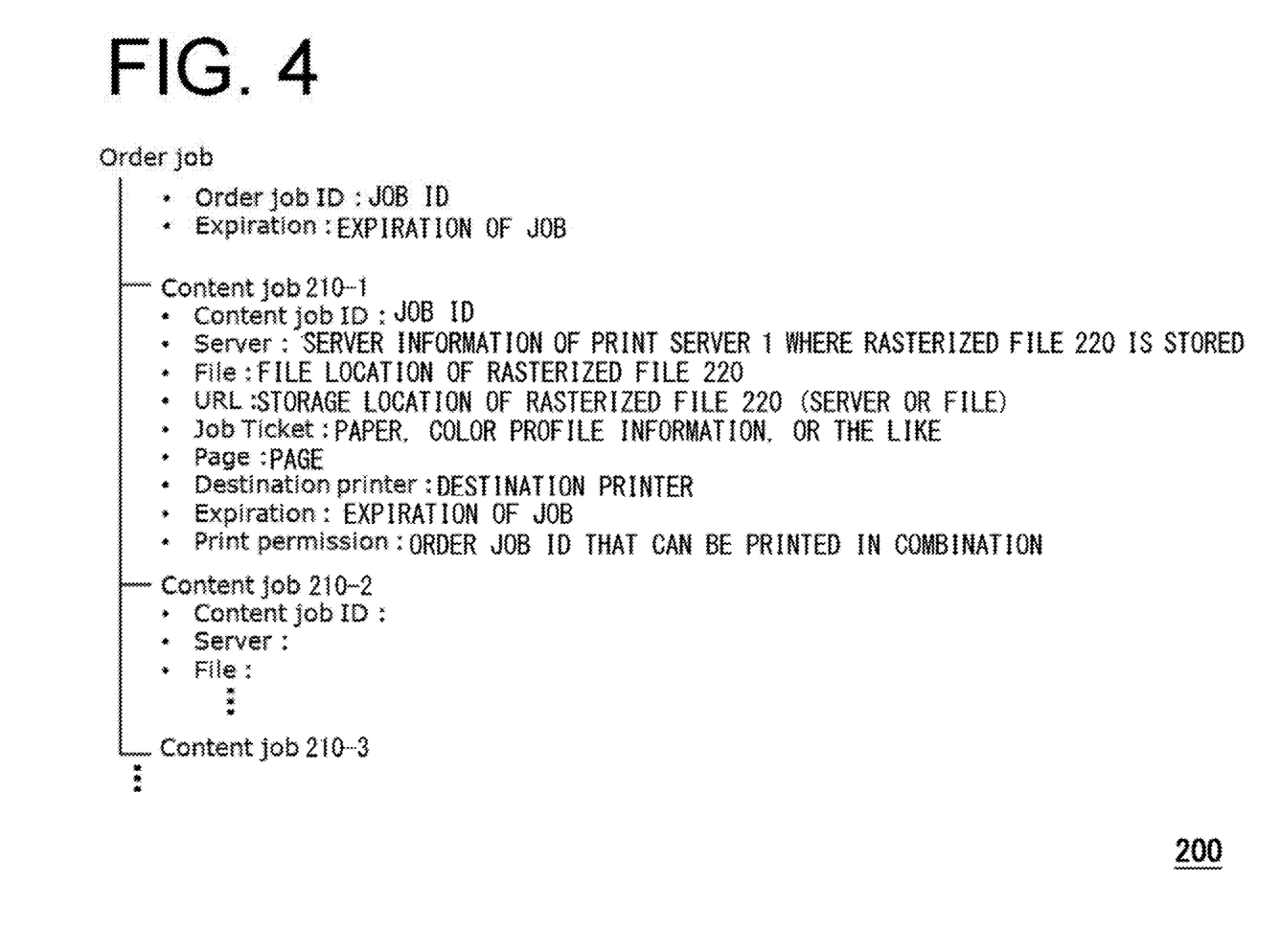
FIG. 4 is a conceptual diagram of the print job as shown in FIG. 3.

Then, with reference to FIG. 4, details of the print job 200 is described.

In the present embodiment, print job 200 is a file used to structure and manage archived print component jobs that is related.

Specifically, print job 200 includes one or more content job(s) 210. The example of FIG. 4 shows an example including content job 210-1, content job 210-2, content job 210-3, Hereinafter, anyone of them is simply referred to as the content job 210.

The content job 210 is a job for each print component.

The content job 210 includes a content job ID (Identification), the location of the print server 1 (Server), the storage location of the rasterized file 220 (File), the URL of the rasterized file 220, the location of the job ticket 230, the number of pages (Page), and the output destination printer (Destination printer), expiration of the content job 210 (Expiration), print permission, and the like are set.

Among these, the content job ID is the ID of the print component for each content job 210.

The location of the print server 1 is URL (Uniform Resource Locator) or IP address of the print server 1 in which the rasterized file 220 is stored. This print server 1 may be the originated print server or the other print server.

The storage location of the rasterized file 220 is the location of the rasterized file 220 on the file system, or the like. The storage location of this rasterized file 220 may be within the other print server in which the rasterized file 220 is stored.

The location of the job ticket 230 is, for example, the location of the job ticket 230 of the content job 210 on the file system. The location of job ticket 230 may also be in the other print server. This allows content job 210 to include job ticket 230 for content job 210.

The number of pages is a data includes the page number, the page position, or the like, on the order. As this page position, for example, it is possible to indicate a position such as n-th page to m-th page from the front cover, or the like. In addition, it is also possible to designate the position of the belt or the advertisement to be inserted, or the like, as this page position.

The expiration date of the content job 210 indicates the expiration date in case that the content job 210 is printed. For example, in the case of advertisements, if the effective date has passed, the content job 210 may not be necessary for reprinting, so it can be set.

The output destination printer indicates the printer that printed when the archive has been generated among the printing apparatuses 2 of the component apparatus.

The print permission is data in which the order job ID, or the like, for the print job 200 that permits printing in combination is set. The print permission may be set to "n/a" (Not Apply), or the like, if the print job 200 that is permitted to be printed is not restricted. Further, the print permission may be set with a user ID of a user who can print, security scope and operation authority, key data, other conditions, and the like.

Additionally, print job 200 may include job information, print data, and process modification information.

The job information is data including print processing attributes. The job information includes the order job ID of the print job 200 and the valid period (Expiration) of the print job 200. This order job ID may be an ID indicating that the print job 200 is for archiving.

Further, the job information may be set the name of the print job 200, the name of the project (order), the reserved printing apparatus 2, the number of copies, the presence or absence of collation, the presence or absence of recording, the number of cutting mm, the printing direction, the printing state, the priority, and the like.

The print data is data of a print document. The print data may be, for example, electronic document data such as PDF, PS (PostScript) data, other vector data, manuscript format data, other raster image data, and the like.

The processing change information is record information of changes during processing of the print job 200. The processing change information may include, for example, information such as correction contents when there is a delay in each print server 1, RIP change in printing, and the like.

Here, the control unit 10 of the print server 1 is caused to function as the archive job generation unit 100 and the reprint unit 110 by executing the control program stored in the storage unit 19.

Also, each unit of the print server 1 described above is a hardware resource that executes the output management method of the present disclosure.

A part or any combination of the functional configurations as described above may be configured in terms of hardware or circuits by using an IC, programmable logic, FPGA (Field-Programmable Gate Array), or the like.

[Print Archive Process by Print Server 1]

Figure 5:
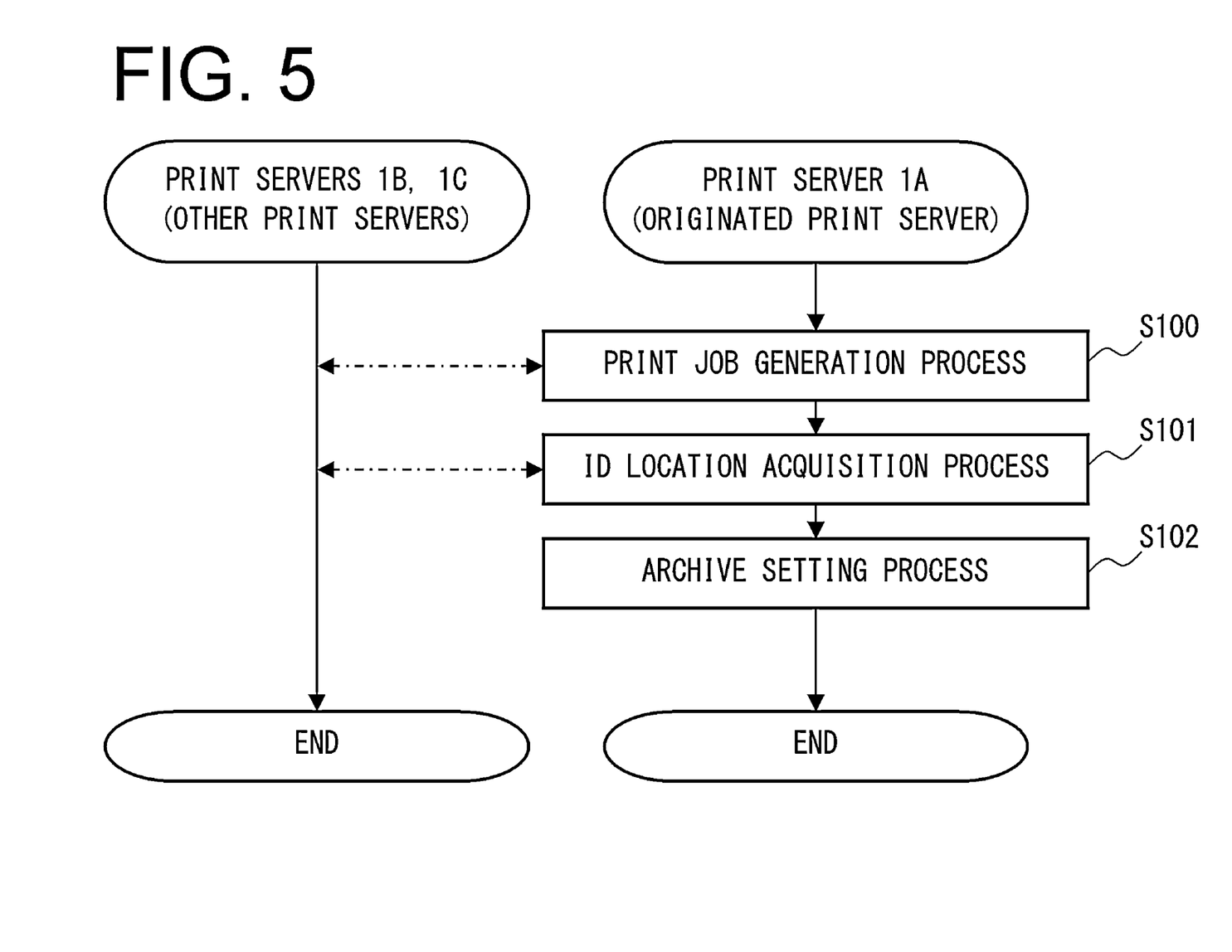
FIG. 5 is a flowchart of print archive process according to an embodiment of the present disclosure.
Figure 6:
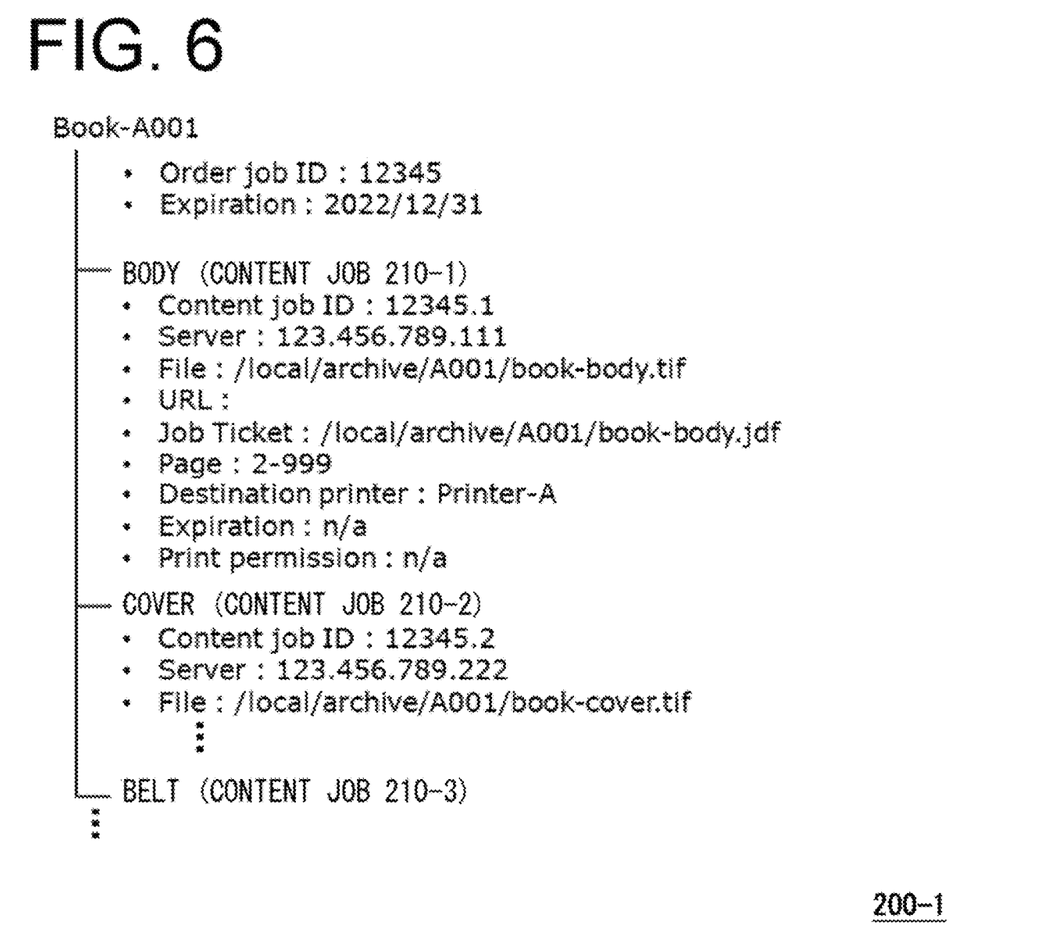
FIG. 6 is a diagram showing an example of a print job in the print archiving process as shown in FIG. 4.

Then, with reference to FIGS. 5 and 6, a print archive process by the print server 1 according to the embodiment of the present disclosure is described.

In the print archiving process of the present embodiment, a print job 200 to archive including the content job 210 is generated for each print component.

In the print archiving process according to the present embodiment, as a typical example, the print server 1a is used as the originated print server (processing request side). Further, an example that the control unit 10 in the print server 1a mainly executes programs stored in the storage unit 19 cooperating with each unit and executing by using hardware resources is described.

As follows, with reference to the flowchart of FIG. 5, the details of the print archiving process are described step by step.

(Step S100)

Firstly, the archive job generation unit 100 performs print job generation process.

The archive job generation unit 100 generates a print job 200 to archive including a content job 210, which is a job for each print component. At this time, the archive job generation unit 100 generates an order job ID and sets it in the print job 200.

The archive job generation unit 100 acquires the print job 200 before archiving from the administrator terminal, the prepress apparatus, or the like. The print job 200 may be set and generated on the GUI (Graphical User Interface) of the dedicated application screen by causing the administrator terminal to execute a web browser or a dedicated application for the manuscript submitted by the submission terminal.

Here, in production printing, there are a lot of printed matters configured to a plurality of printing components, such as bookbinding printing, or the like. The archive job generation unit 100 also generates a content job 210 including a job ticket 230 of each component according to the user's instruction and includes it in the print job 200 by using the GUI.

At this time, the archive job generation unit 100 can set expiration dates for the print job 200 and each content job 210. For example, since the binding band includes advertisement information, or the like, it is necessary to set an appropriate period. Therefore, the archive job generation unit 100 can set the appropriate period for each content job 210 according to the user's instruction.

The archive job generation unit 100 transmits the job ticket 230 of the content job 210 of each print component to the other print server for printing.

In the example of the present embodiment, the print server 1 that generates this print job 200 is the originated print server (the print server 1 that requests print processing to the other print server).

When the other print server obtains the job ticket 230 of the content job 210, it sets the content job ID. Then, the other print server RIPs the content job 210 to generate the rasterization file 220. Then, the other print server separately prints the rasterized files 220 according to the processing capability of the printing apparatus 2. At this time, printing may be performed by combining any one or combination of the plurality of printing apparatuses 2.

After that, the other print servers store the rasterized file 220 in the set storage location. At this time, the other print server sets the order job ID of the print component in the rasterization file 220 to prevent separation.

Alternatively, the archive job generation unit 100 may RIP and print the content job 210 at the originated print server. In this case, the RIP-processed rasterized file 220 is stored in the storage unit 19 of the originated print server.

Here, the originated print server acquires the printed matter in a post-processing step and creates a final order.

(Step S101)

Then, the archive job generation unit 100 performs ID location acquisition process.

The other print server returns the content job ID and the save location of the rasterized file 220 to the originated print server.

The archive job generation unit 100 in the originated print server acquires each content job ID and storage location from each other print server.

(Step S102)

Then, the archive job generation unit 100 performs archive setting process.

Here, the archive job generation unit 100 sets the acquired content job ID and the storage location to the content job 210 of the print job 200.

In addition, the archive job generation unit 100 sets access conditions for the print job 200 to be archived.

The archive job generation unit 100 sets the order job ID of the print job 200 permitted to be printed to each content job 210. In other words, some print components, such as an advertisement page in the main body, may be shared and used by a plurality of print jobs 200. In such a case, the archive job generation unit 100 sets the content job 210 with print permission that allows printing only in combination with a specific print job.

In FIG. 6, an example of the print job 200-1 after the archive setting process has actually been executed is shown.

In this example, the order "Book-A001" is configured with the content jobs 210-1 to 210-3 for the components of book body, cover, and belt, respectively. Above this, in each content job 210, it is set that the rasterized file 220 is stored in the location of the print server 1 (Server) and in the storage location of the rasterized file 220 (File).

With the above, the print archiving process according to the present embodiment completes.

[Reprint Process by Print Server 1]

Figure 7:
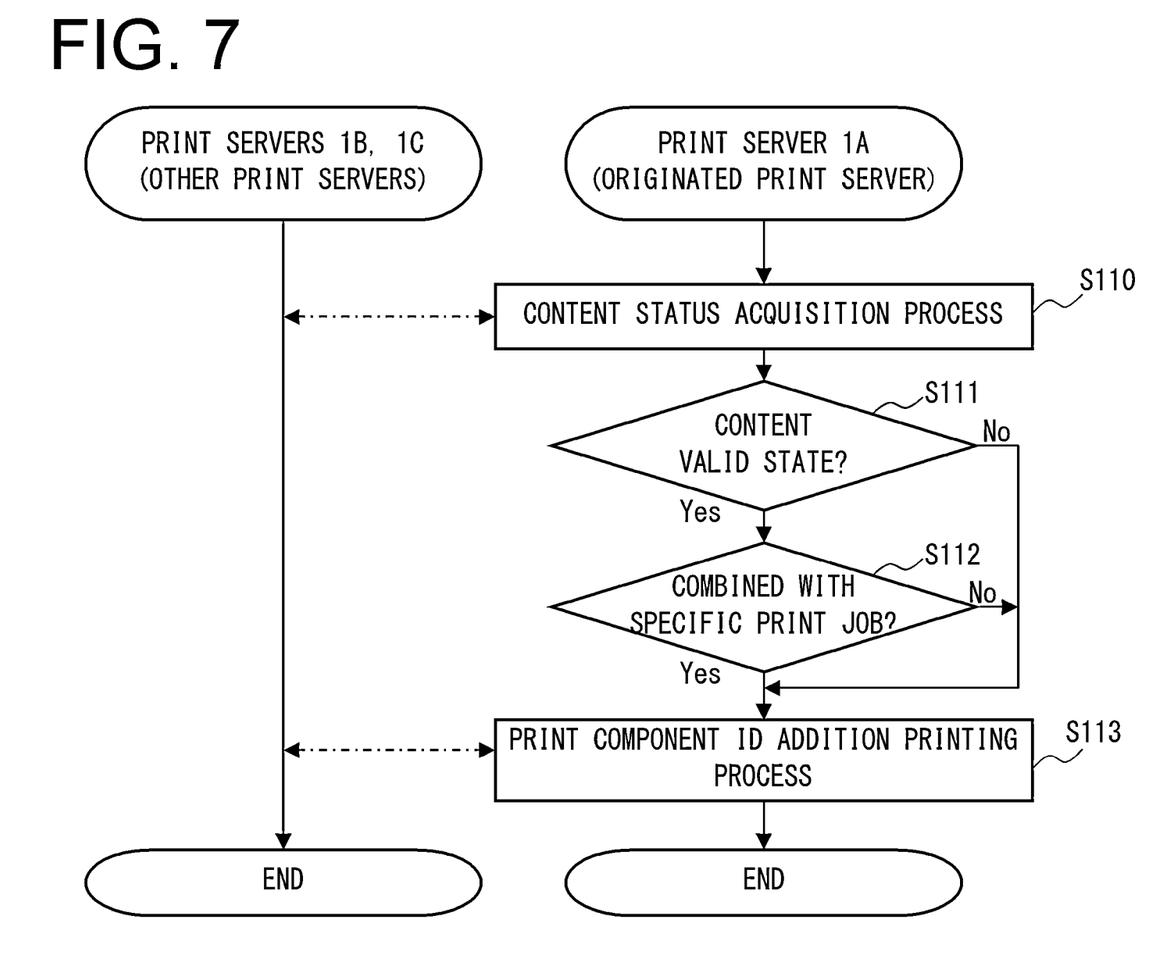
FIG. 7 is a flowchart of reprint process according to the embodiment of the present disclosure.

Next, with reference to FIG. 7, reprint process by the print server 1 according to the embodiment of the present disclosure is described.

A printing company may reprint the same order for regular orders, reprints, or the like. In the case of such reprinting, the print job 200 stored for archiving in the above-described print archiving process is used.

In the reprinting process of the present embodiment, the content job 210 included in the print job 200 is sent to the other print server to execute reprinting.

In the reprinting process according to the present embodiment, an example that the print server 1*a* is used as the originated print server is described. Further, also in this example, mainly the control unit 10 of the print server 1*a* executes programs stored in the storage unit 19 in cooperation with each unit and using hardware resource is described.

As follows, with reference to the flowchart of FIG. 7, the details of the reprinting process are described step by step.

(Step S110)

Firstly, the reprint unit 110 performs content state acquisition process.

When reprinting an order, the reprint unit 110 of the originated print server reads the archived print job 200 from the storage unit 19. Then, the reprint unit 110 sets the content job ID to access the other print server set in the content job 210 of each print component.

When the other print server receives this, it returns the status information of the content job 210 to the originated print server based on the content job ID. This status information includes information such as the status of the stored rasterized file 220, the status in which content job 210 can be printed or not, or the like.

The reprint unit 110 obtains and analyzes the status information from the other print server.

(Step S111)

Then, the reprint unit 110 determines whether the content is valid state or not. The reprint unit 110 determines Yes if the print job 200 is within the valid period (expiration), each content job 210 of the print job 200 is within the valid period (expiration) of the content job 210, the rasterized file 220 exists according to the status information, and the content job 210 can be printed.

Otherwise, the reprint unit 110 determines No.

In the case of the content job 210 that is Yes, the reprint unit 110 advances the process to step S111.

In the case of the content job 210 that is No, the reprint unit 110 ends the reprinting process according to the present embodiment. As a result, the reprint unit 110 enables to not reprint the content job 210 whose expiration date has expired.

(Step S112)

If the content is valid, the reprint unit 110 determines whether or not it is combined with the specific print job. The reprint unit 110 refers to the print permission for each content job 210 of the print job 200, and if the order job ID of the print job 200 is permitted in the content job 210, determines Yes. Specifically, the reprint unit 110 may determine Yes if, for example, the same ID as the order job ID is set in the print permission or "n/a" is set. Otherwise, the reprint unit 110 determines No.

In the case of Yes, the reprint unit 110 advances the process to step S113.

If the case of No, the reprint unit 110 ends the reprinting process according to the present embodiment. As a result, the reprint unit 110 can reprint only in combination with the specific print job.

(Step S113)

In the case of combination with the specific print job, the reprint unit 110 performs print component ID addition print process.

The reprint unit 110 transmits the job ticket 230 of the content job 210 included in the print job 200 to the other print server to execute reprinting. At this time, the reprint unit 110 instructs printing by using the rasterization file 220 in order to print with the same print quality.

Then, the reprint unit 110 instructs each content job 210 to be printed by adding the content job ID. In the present embodiment, the reprint unit 110 can encode the content job ID with a barcode, or the like, and print it in the margin of the printed matter. As a result, it is possible to use the post-processing apparatus 3 for post-processing, such as a process of collecting printed matters that have been printed, or the like.

With the above, the reprinting process according to the embodiment of the present disclosure completes.

As described above, the print server 1 of the present embodiment can execute an industrial printing method including print archive process for generating the archive and reprint process for reprinting the archive.

As configured in this way, the following effects can be obtained.

In typical production printing, printed matter configured to a plurality of printing components is often ordered, such as bookbinding printing. In such printing, each printed component is printed separately according to the throughput of the printing apparatus, post-processed, and finished as a final print.

Here, printing companies often reprint the same printed material for regular orders or reprints. However, since a printed matter configured to a plurality of printed components is not taken into consideration, the user must confirm that the job of each component saved in each print server 1 is a related component of the target printed matter and then print it. For this reason, there is a possibility of causing printing errors.

On the other hand, the industrial printing system X according to the present embodiment is an industrial printing system having a plurality of print servers 1 for production printing, any of the plurality of print servers 1 including: an archive job generation unit 100 that generates a print job 200 to archive including a content job 210 that is a job for each print component; and a reprint unit 110 that transmits the content job 210 included in the print job 200 generated by the archive job generation unit 100 to the other print server to execute reprinting; and wherein the content job 210 includes a storage location allowing in the other print server in which a rasterized file 220 that is a file in which the print component is rasterized is stored, and a job ticket 230 for the content job 210.

By configuring in this way, the print job 200 as such configured to a plurality of print components can be structured and archived, and the content job 210 of the related print components can be collectively managed and reprinted by using the job ticket 230. Thus, the archived print job 200 can be reprinted without complication. As a result, it is possible to prevent printing errors such as reprinting with an incorrect combination of printing components.

In addition, by storing not only the original document but also the storage location of the rasterized file 220 that has been rasterized for each content job 210, the stored rasterized file 220 can be printed when reprinting. This makes it possible to easily print with the same print quality.

Further, printed materials such as bookbinding bands and advertisement pages contain advertising information that has the expiration date, or the like. Thus, when reprinting, the time limit may have expired, and it may not be appropriate.

On the other hand, in the industrial printing system X according to the present embodiment, each content job 210 is set with an expiration date, and the reprint unit 110 does not reprint the content job 210 that is expired the expiration date.

By configuring in this way, mistakes in printing print components including advertising information with a time limit can be reduced.

Further, in the industrial printing system. X according to the present embodiment, each content job 210 is set with a print job 200 that permits printing, and the reprint unit 110 performs reprinting only in combination with the specific print job, which is the print job 200 that is permitted.

By configuring in this way, a situation in which a commonly used content job 210 such as an advertisement page is reprinted as a content job 210 in an unintended print job 200 can be prevented. As a result, the user's trouble can be reduced.

In the industrial printing system X according to the present embodiment, the archive job generation unit 100 acquires each content job ID and the storage location from the other print server when generating the print job 200, and sets them in the content job 210, and the reprint unit 110 adds the content job ID to each content job 210 and prints the content job 210 when reprinting.

By configuring in this way, each printed component can be easily put together in post-processing at the time of reprinting. Therefore, the user's trouble in reprinting can be reduced.

In the industrial printing system X according to the present embodiment, the reprint unit 110 acquires the status of the content jobs 210 from the other print server based on the content job ID of each content job 210 at the time of reprinting.

By configuring in this way, even if situations such as the rasterized file 220 is not stored in the other print server, the other print server cannot print due to operational status or schedule, or the like, arise, it can be handled.

Therefore, the user's trouble in reprinting can be reduced.

Other Embodiments

In addition, in the above-described embodiment, an example of reprinting each content job 210 by a plurality of print servers 1 has been described.

However, a configuration that the originated print server determines to be processable based on the processing requirements of the print job 200 and prints the content job 210 is possible. In this case, the rasterized file 220 may be obtained from the other print server, and the originated print server causes to print it.

By configuring in this way, even if printing is not performed on the other print server, printing can be performed on the originated print server, which saves time and effort.

Further, in the above-described embodiment, an example of reprinting only the print job 200 has been described.

However, even in the post-processing process, it can be configured that the post-processing may be performed by a plurality of print servers 1. In this case also, the content job 210 may be post-processed by several post-processing apparatuses 3 and collected.

Further, one of the other print servers may be distributed to process both the print job 200 and the other content job 210 which is a post-processing job.

In addition, priority may be given as to which print server 1 is the other print server. This priority may be set based on how busy the schedule is, the number and performance of component apparatuses, cost, and other information.

By configuring in this way, the print job 200 can be distributed to each of the print servers 1 and processed more efficiently.

Further, in the above-described embodiment, the example in which the print job 200 sent to the other print server is held as it is even after being reprinted has been described.

However, the print job 200 after being reprinted may be deleted. Further, the content jobs 210 may also be deleted after or even before the expiration date. Alternatively, the content job 210, rasterized file 220, and job ticket 230 may be sent from the other print server to the origin print server before they are deleted at the other print server. Also, after the printing process is finished, the post-processing process may be processed by a print server other than the one that has been execute printing.

By configuring in this way, the processing can be made more efficient.

In the above embodiment, the example of acquiring the status of each content job 210 from the other print server during reprinting has been described.

As regarding this, in addition to the time of reprinting, information of the change may be communicated from the other print server after processing for each content job 210 at the time of initial printing. Furthermore, the originated print server may set this change information in the processing change information of the print job 200.

By configuring in this way, at the time of reprinting, each content job 210 can be printed in a state in which the change processing information is reflected.

Further, in the above-described embodiment, an example of requesting the other print server to process the print job 200 as it is has been described.

However, the print job 200 itself can also be changed according to the result of processing the print job 200, a change in the schedule, or the like. In this case, for example, the number of pages, the color profile to be used, or the like, can be changed for the print job 200 that can be processed.

Alternatively, the print job 200 itself can be divided, and the divided print job 200 can be transmitted to the originated print server or a print server 1 different from the requested other print server.

With this configuration, even if trouble occurs, the print job 200 can be executed by distributed processing.

Furthermore, the print job 200 can include the rasterized file 220 RIP-ed by this print server 1.

As a result, even when retransmitting to a print server other than the requested print server 1, it is possible to perform the same output, or the like.

In addition, the archive job generation unit 100 may set an expiration date for the content job 210 that is different from the expiration date at the time of generation of the print job 200 as described above. In this case, the archive job generation unit 100 can acquire the expiration date of the rasterized file 220 from the other print server and set it in the content job 210 of the print job 200.

As a result, when the rasterized file 220 cannot be stored for a long time due to the storage capacity of the storage unit 19 of the other print server, security, or the like, the expiration date can be set by an instruction from the other print server.

Also, in the above-described embodiment, as production printing, an example in which paper prints are the order is described. However, the present disclosure is also applicable to production printing other than this.

Further, it can also be used for, for example, division printing of large-sized posters, sheet printing of exterior and interior of aircraft and automobiles, manufacture of electronic parts such as flat displays and electronic substrates, and printing of cultured cells. In this case, industrial inkjet printers, industrial robots, various reaction apparatuses, culture apparatuses, or the like, can be used as component apparatuses.

By configuring in this way, it becomes possible to correspond to various uses.

Further, the configuration and operation of the above-described embodiment are examples, and needless to say, they can be modified and executed as appropriate without departing from the scope of the present disclosure.

What is claimed is:

1. An industrial printing system having a plurality of print servers for production printing, any of the plurality of print servers comprising:
   an archive job generation unit configured to generate a print job to archive, wherein the print job to archive is a file used to structure and manage one or more content jobs that are one or more jobs for each print component; and
   a reprint unit configured to transmit the one or more content jobs managed for the print job generated by the archive job generation unit to other print server to execute reprinting; and wherein
   the one or more content jobs include a storage location allowing in the other print server in which a rasterized file that is a file in which the print component is rasterized is stored, and a job ticket for the content job, and
   the print job to archive is set up with the content job set with the storage location of the rasterized file.

2. The industrial printing system according to claim 1, wherein:
   the one more content jobs have an expiration date, and
   the reprint unit does not reprint the content job that is expired based on the expiration date; wherein
   the expiration date is a valid date for excluding cases which are not necessary at a time of reprinting.

3. The industrial printing system according to claim 1, wherein:
   the one or more content jobs are set with the print job that permits printing, and
   the reprint unit reprints only in combination with the print job that is permitted; wherein
   the one or more content jobs are allowed to be shared by a plurality of print jobs.

4. The industrial printing system according to claim 1, wherein:
   the archive job generation unit acquires the ID and the storage location of each of the one or more content jobs from the other print server when generating the print job to set in the one or more content jobs; and
   the reprint unit adds the ID to each of the one or more content jobs when reprinting, wherein
   the system further comprises a post processing apparatus; and
   the ID is added and printed such that printed matters are allowed to be collected for post-processing by the post-processing apparatus.

5. The industrial printing system according to claim 4, wherein:
   the reprint unit acquires the status information of the one or more content jobs from the other print server based on the ID of each of the one or more content jobs at the time of reprinting; wherein
   the status information includes status of stored rasterization file and status of printability of the one or more content jobs.

6. A print server for production printing comprising:
   an archive job generation unit configured to generate a print job to archive, wherein the print job to archive is a file used to structure and manage one or more content jobs that are one or more jobs for each print component; and
   a reprint unit configured to transmit the one or more content jobs managed for the print job generated by the archive job generation unit to other print server to execute reprinting; and wherein
   the one or more content jobs include a storage location allowing in the other print server in which a rasterized file that is a file in which the print component is rasterized is stored, and a job ticket for the content job, and
   the print job to archive is set up with the content job set with the storage location of the rasterized file.

7. The print server according to claim 6, wherein:
   the one more content jobs have an expiration date, and
   the reprint unit does not reprint the content job that is expired based on the expiration date; wherein
   the expiration date is a valid date for excluding cases in which are not necessary at a time of reprinting.

8. The print server according to claim 6, wherein:
   the one or more content jobs is set with the print job that permits printing, and
   the reprint unit reprints only in combination with the print job that is permitted; wherein
   the one or more content jobs are allowed to be shared by a plurality of print jobs.

9. The print server according to claim 6, wherein:
   the archive job generation unit acquires the ID and the storage location of each of the one or more content jobs from the other print server when generating the print job to set in the one or more content jobs; and
   the reprint unit adds the ID to each of the one or more content jobs when reprinting, wherein
   the ID is added and printed such that printed matters are allowed to be collected for post-processing by a post-processing apparatus.

10. The print server according to claim 9, wherein:
    the reprint unit acquires the status information of the one or more content jobs from the other print server based on the ID of each of the one or more content jobs at the time of reprinting; wherein
    the status information includes status of stored rasterization file and status of printability of the one or more content jobs.

11. An industrial printing method performed by an industrial printing system having a plurality of print servers for production printing, comprising the steps of:
    generating a print job to archive, wherein the print job to archive is a file used to structure and manage one or more content jobs that are one or more jobs for each print component, wherein
    the one or more content jobs include a storage location allowing in other print server in which a rasterized file that is a file in which the print component is rasterized is stored, and a job ticket for the content job;
    sending the one or more content jobs to the other print server to execute reprinting; and
    the print job to archive is set up with the content job set with the storage location of the rasterized file.

12. The industrial printing method according to claim 11, wherein:
the one or more content jobs have an expiration date, and
the method comprises not reprinting a content job that is expired based on the expiration date.

13. The industrial printing method according to claim 11, wherein:
the one or more content job is set with the print job that permits printing, and
the method comprises reprinting only in combination with the print job that is permitted;
the one or more content jobs are allowed to be shared by a plurality of print jobs.

14. The industrial printing method according to claim 11, further comprising:
acquiring the ID and the storage location of each of the one or more content job from the other print server when generating the print job to set in the one or more content jobs; and
adding the ID to each of the one or more content jobs when reprinting;
wherein the ID is added and printed such that printed matters are allowed to be collected for post-processing by a post-processing apparatus.

15. The industrial printing method according to claim 14, further comprising:
acquiring the status information of the one or more content jobs from the other print server based on the ID of each of the one or more content jobs at the time of reprinting,
wherein the status information includes status of stored rasterization file and status of printability of the one or more content jobs.

16. The industrial printing system according to claim 1, wherein the rasterized file is a file generated at the time of printing by originated print server or the other print server.

17. The industrial printing system according to claim 4, wherein
the reprint unit encodes the ID of the one or more content jobs with a bar code and print the bar code in the margin of the printed matter.

18. The industrial printing system according to claim 1, wherein
the print job is set with an order job ID indicating that it is for archival use, and
the other print server sets the order job ID in the rasterized file to prevent separation.

* * * * *